United States Patent
Has

(10) Patent No.: US 6,650,030 B2
(45) Date of Patent: Nov. 18, 2003

(54) ELECTRICAL DEVICE HAVING A POWER SUPPLY UNIT, A TRANSFORMER POWER SUPPLY UNIT AND A CONTROL CARD FOR AN ELECTRICAL DEVICE

(75) Inventor: Uwe Has, Unterneukirchen-Oberschroffen (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 10/045,689

(22) Filed: Jan. 14, 2002

(65) Prior Publication Data

US 2002/0085400 A1 Jul. 4, 2002

Related U.S. Application Data

(63) Continuation of application No. PCT/EP00/06410, filed on Jul. 6, 2000.

(30) Foreign Application Priority Data

Jul. 12, 1999 (DE) .......................... 199 32 453

(51) Int. Cl.[7] .................................................. H01H 3/26
(52) U.S. Cl. ..................... 307/140; 307/141.4; 307/139
(58) Field of Search ................................ 307/139, 140, 307/141.4

(56) References Cited

U.S. PATENT DOCUMENTS

| | | | | | |
|---|---|---|---|---|---|
| 4,578,542 A | * | 3/1986 | Alderman | ............... | 379/376.01 |
| 4,656,318 A | * | 4/1987 | Noyes | .................... | 379/102.04 |
| 5,359,540 A | * | 10/1994 | Ortiz | ......................... | 700/295 |
| 5,608,546 A | * | 3/1997 | Nakamura et al. | .......... | 358/442 |
| 5,659,401 A | * | 8/1997 | Yoshida | ....................... | 358/400 |
| 5,914,538 A | * | 6/1999 | Kurosawa et al. | .......... | 307/141 |
| 6,018,802 A | * | 1/2000 | Abe et al. | .................... | 365/229 |
| 6,088,128 A | * | 7/2000 | Nishii et al. | ................. | 358/434 |
| 6,230,970 B1 | * | 5/2001 | Walsh et al. | ................. | 235/379 |

FOREIGN PATENT DOCUMENTS

| | | |
|---|---|---|
| DE | 42 23 596 A1 | 12/1992 |
| DE | 44 01 406 A1 | 7/1995 |
| DE | 195 12 204 A1 | 8/1995 |
| DE | 44 39 057 A1 | 11/1995 |
| DE | 44 20 684 A1 | 12/1995 |
| DE | 195 03 243 A1 | 8/1996 |
| DE | 297 09 014 U1 | 7/1997 |
| DE | 197 02 562 A1 | 7/1998 |
| EP | 0 358 441 A2 | 3/1990 |
| EP | 0 806 825 A2 | 11/1997 |

* cited by examiner

*Primary Examiner*—Brian Sircus
*Assistant Examiner*—Sharon A. Polk
(74) *Attorney, Agent, or Firm*—Laurence A. Greenberg; Werner H. Stemer; Gregory L. Mayback

(57) ABSTRACT

In an electrical device for controlling functional units and processing data, for connection to an external data network communicating signals, and for switching between quiescent and active states, the improvement includes a control unit for controlling the functional units and having lines connected to the network for receiving signals starting data processing at the device, a power supply unit for supplying the units with energy, the supply unit primary side to be connected to a voltage supply and connected to the control unit, an electrical switch, connected to and switching the supply unit, entering into an open position and disconnecting the primary side from the voltage supply network in the quiescent state, and entering into a closed position dependent upon the power received from the ringing signal in the active state, and the switch remaining in one of the positions based upon the energy from the supply unit.

9 Claims, 1 Drawing Sheet

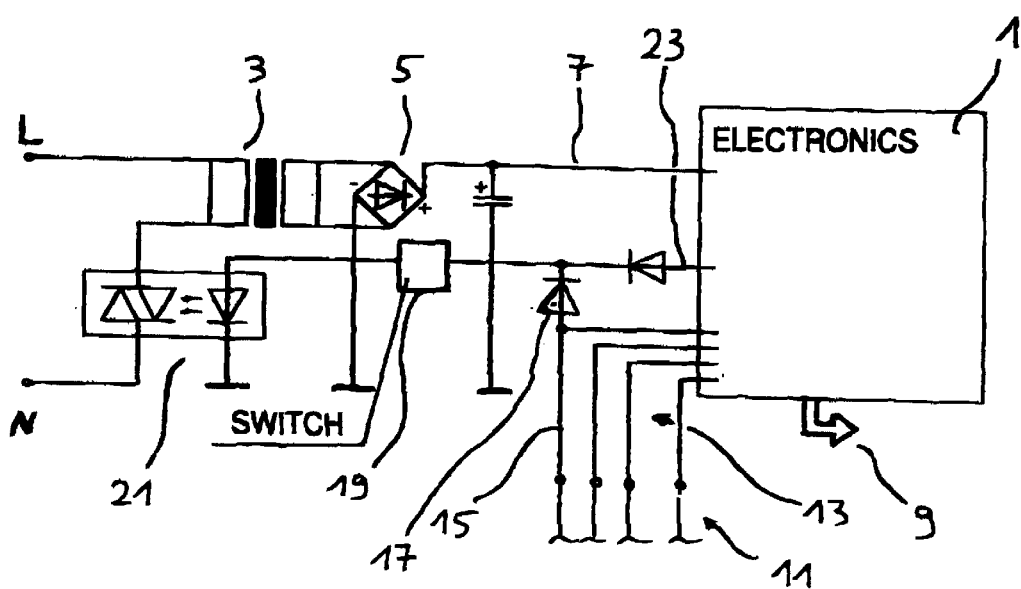

ELECTRICAL DEVICE HAVING A POWER SUPPLY UNIT, A TRANSFORMER POWER SUPPLY UNIT AND A CONTROL CARD FOR AN ELECTRICAL DEVICE

CROSS-REFERENCE TO RELATED APPLICATION

This application is a continuation of copending International Application No. PCT/EP00/06410, filed Jul. 6, 2000, which designated the United States.

BACKGROUND OF THE INVENTION

Field of the Invention

The invention relates to an electrical device having a control unit and having at least one power supply unit, which is connected to a voltage supply network and can be switched through a switch, for supplying functional units (which are to be controlled) and the control unit. The control unit can be connected through lines to a data network external to the device, through which data network control signals, in particular, a ringing signal, are sent to the control unit to start data transmission from or to the electrical device. The invention also relates to a correspondingly configured transformer power supply unit and a control card for a corresponding electrical device.

Such an electrical device and such a control card are disclosed in the document German Published, Non-Prosecuted Patent Application DE 197 02 562 A1, which describes a control card for switching devices/systems remotely through the telephone network. The control card has at least three connecting sockets with internal switches, so that at least three devices can be switched remotely. The switches, preferably, relays, are driven and switched by a frequency-coded numerical combination that is entered by the user, from a system controller on the control card, and/or is checked to monitor the switching state. The control card is operated at a voltage of about 9 to 18 V, with the voltage that is applied at the mains connection to the control card being transformed down or the supply voltage being provided by batteries or a transformer. The devices to be switched are connected by their device connection, generally, a mains plug, to the connecting sockets of the control card. Internally, the connecting sockets are connected through power lines to the mains connection on the control card so that the connected devices can be supplied with power. Each connecting socket has an associated switch, by which the corresponding power line can be interrupted, and the connected device can, thus, be switched. The system controller drives the switches through control lines, with the system controller having the capability to check and/or to change the switching state of the switches.

Furthermore, a circuit configuration for a load that can be connected to the telephone line is disclosed in German Published, Non-Prosecuted Patent Application DE 44 20 684 A1. The circuit configuration allows actuation as a function of the signals applied to the input of the circuit configuration. The configuration is configured such that the load is switched on in a functionally reliable manner when a ringing signal occurs, and is disconnected after completion of information transmission, and independently of its time duration. The load may be, for example, a fax machine, an answering machine, or a personal computer ("PC") with an integrated fax card. The circuit configuration is connected to a DC voltage of, in particular, 12 V to supply power to the components provided on the circuit configuration.

A power supply for a personal computer is also disclosed in German Published, Non-Prosecuted Patent Application DE 195 12 204 A1. In the document, an integrated control and monitoring unit is provided, which monitors the data traffic to the PC and activates the power supply, hence switching on the PC, when data transmission occurs. Thus, the power consumption of the PC is minimized at times in which it is not required.

SUMMARY OF THE INVENTION

It is accordingly an object of the invention to provide a electrical device having a power supply unit, a transformer power supply unit, and a control card for an electrical device that overcomes the hereinafore-mentioned disadvantages of the heretofore-known devices of this general type and that has a zero standby power consumption.

With the foregoing and other objects in view, in an electrical device for controlling functional units and processing data, for connection to an external data network communicating data network control signals including a ringing signal having an electrical power, and for switching between a quiescent state and an active state, there is provided, in accordance with the invention, an improvement including a control unit for controlling at least one of the functional units, the control unit having lines to be connected to the external data network for receiving the data network control signals starting data processing at the electrical device, at least one power supply unit for supplying at least one of the functional units with energy, the at least one power supply unit having a primary side to be connected to a voltage supply network, the at least one power supply unit connected to the control unit, an electrical switch having an open position and a closed position, connected to and switching the at least one power supply unit, entering into the open position and disconnecting the primary side of the at least one power supply unit from the voltage supply network in the quiescent state, and entering into the closed position dependent upon the electrical power received from the ringing signal in the active state, and the switch remaining in one of the positions based upon the energy from the at least one power supply unit.

According to the invention, the zero standby power consumption is achieved when, in the quiescent state or in the standby mode, the switch disconnects the primary side of the power supply unit of the electrical device from the voltage supply network, ensuring that even the no-load losses of the power supply unit are virtually zero. In addition, there is no need to supply any power to the electrical device in the standby mode because the small amount of electrical power in the ringing signal itself closes the electrical switch to activate the electrical device when required. A significant feature is that the amount of power that is required to switch the switch that switches the power supply unit remains in the same order of magnitude as the power required in any case to operate, for example, the control mechanism of a telephone or a fax machine. Thus, it is possible to comply with the regulations that restrict or forbid electrical power being drawn, for example, from the data network of the telephone authorities.

To draw as little power as possible from the data network during the switching process, in accordance with another feature of the invention, an optocoupler component is advantageously used as the electrical switch.

In accordance with a further feature of the invention, the switch and the control unit are connected through a switch control line. The connection ensures that, once the electrical device has been activated, the control unit can monitor the switch. In particular, once the data transmission or the process to be carried out by the electrical device has been completed, the control unit can operate the switch in a defined manner, and can disconnect the primary side of the electrical device from the network.

In accordance with an added feature of the invention, the control unit starts transmitting data from the electrical device after receipt of the data network control signals.

In accordance with an additional feature of the invention, the control unit starts transmitting data from the electrical device after receipt of the ringing signal.

In accordance with yet another feature of the invention, the control unit starts receiving data sent to the electrical device after receipt of the data network control signals.

In accordance with yet a further feature of the invention, the control unit starts receiving data from the electrical device after receipt of the ringing signal.

With the objects of the invention in view, in an electrical device for controlling functional units and processing data, for connection to an external data network communicating data network control signals including a ringing signal having an electrical power, and for switching between a quiescent state and an active state, there is also provided an improvement including means for controlling at least one of the functional units, the control means having lines to be connected to the external data network for receiving the data network control signals starting data processing at the electrical device, means for supplying energy to at least one of the functional units, the energy supply means having a primary side to be connected to a voltage supply network, the energy supply means connected to the control unit, means for switching between an open position and a closed position, the switching means connected to and switching the at least one power supply unit; entering into the open position and disconnecting the primary side of the at least one power supply unit from the voltage supply network in the quiescent state, and entering into the closed position dependent upon the electrical power received from the ringing signal in the active state, and the switching means remaining in one the positions based upon the energy from the at least one power supply unit.

With the objects of the invention in view, there is also provided a transformer power supply unit including a primary side to be connected to a voltage supply network having a network voltage, an electrical switch for selectively switching the network voltage on and off, a data line to be connected to an external data network transmitting a ringing signal having electrical power, and the switch connected to the primary side and to the data line, opening, in a quiescent state, to disconnect the primary side from the voltage supply network, and closing, in an active state, to connect the primary side to the voltage supply network based upon the electrical power of the ringing signal.

Other features that are considered as characteristic for the invention are set forth in the appended claims.

Although the invention is illustrated and described herein as embodied in a electrical device having a power supply unit, a transformer power supply unit and a control card for an electrical device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWING

The FIGURE is a block and schematic circuit diagram of the device according to the invention.

DESCRIPTION OF THE PREFERRED EMBODIMENTS

Referring now to the single FIGURE of the drawing, an exemplary embodiment of an electrical device and/or a transformer power supply unit according to the invention is described. An electrical device such as a fax machine or an electrical household appliance, for example, a cooker with an electrical clock unit, has electronics 1 including, for example, a processor, keys, displays and the like for input and output, and for controlling the electrical device.

The electronics 1 and any power loads that may possibly be present as well, such as heating elements in a cooker, are supplied from a power supply unit 3, 5 whose primary side is connected to a voltage supply network L, N. The power supply unit 3, 5 has, in particular, a transformer 3 and a downstream rectifier bridge 5 that is connected through a voltage supply line 7 to the electronics 1. Among other items, control lines 9 originate from the electronics 1 to control loads in the electrical device. Furthermore, the electrical device is connected to an external data network 11, such as the telephone network, customary data networks for household devices, or a bus system. For such a purpose, the electronics 1 of the electrical device are connected to the external data network 11 through internal data lines 13. In particular, a ringing line 15 is provided in the electrical device, and is connected to a corresponding line in the external data network 11. The ringing line 15 is connected, within the device, first through an output diode 17 and a switching unit 19 to a switch 21, preferably, an optocoupler 21. Second, the ringing line 15 is connected directly to the electronics 1. Furthermore, a switch control line 23 is also provided, to connect the electronics 1 to the switching unit 19. The optocoupler 21 that is used as a switch is connected in the primary circuit of the transformer 3.

The schematically illustrated configuration operates as set forth in the following text.

When the device is in the standby mode or the quiescent state, the switch 21 is open. As such, the primary side of the power supply unit 3, 5 is disconnected from the voltage supply network L, N. The power consumption of the electronics 1 and of the electrical device that is supplied from the power supply unit 3, 5 is virtually zero (0). If the electrical device is to be operated now, on one hand, it can be switched on manually through a non-illustrated main switch. On the other hand, the electrical device can also be switched on by remote control through the external data network 11. The automatic activation is done, for example, by briefly applying a ringing signal to the ringing line 15. The signal may be, for example, the conventional "ringing signal"—an AC voltage signal of 60 V AC or some other pulsed voltage signal. In the standby mode, and/or when the electrical device has no voltage whatsoever applied to it, the input of the ringing line 15 is connected such that virtually all the power in the ringing signal is passed through the output diode 17 to the switching unit 19. By way of example, the action may take place in the form of a charge store with a threshold value switch. Even a signal duration of a few milliseconds with an input current of a few milliamperes is sufficient to provide enough energy to switch the optocoupler 21. In such a case, the switching unit 19 is configured such that, based upon the selected optocoupler 21 and/or switching element, the electrical power available on the ringing line 15 is reliably sufficient to switch the optocoupler 21. The closing of the switch 21 results in the primary side of the power supply unit 3, 5 being connected to the voltage supply network L, N. Then, the electronics 1 and all the other components of the electrical device are connected to the voltage. The electrical device is ready to operate, and data communication can take place between the electronics 1 and the external data network 11. The electronics 1 keep the switch 21 closed through the switch control line 23 for as long as necessary. Following the desired operation of the electrical device, which is predetermined by the data transmission, the electronics 1 or an independent time switching element once again switch or switches the optocoupler 21, and, thus, once again disconnects the primary side of the electrical device from the voltage supply network L, N. The device is now completely disconnected from the voltage once again, but is, nevertheless, ready to operate at any time.

The configuration according to the invention can be provided both in the electrical device and in a transformer power supply unit for the electrical device, or in a control card for the electrical device.

I claim:

1. In an electrical device for controlling functional units and processing data, for connection to an external data network communicating data network control signals including a ringing signal having an electrical power, and for switching between a quiescent state and an active state, the improvement comprising:
    a control unit for controlling at least one of the functional units, said control unit having lines to be connected to the external data network for receiving the data network control signals, and said control unit starting data transmission from or to the electrical device after receiving the data network control signals;
    at least one power supply unit for supplying at least one of the functional units with energy, said at least one power supply unit having a primary side to be connected to a voltage supply network, said at least one power supply unit connected to said control unit;
    an electrical switch:
        having an open position and a closed position;
        connected to and switching said at least one power supply unit;
        entering into said open position and disconnecting said primary side of said at least one power supply unit from the voltage supply network in the quiescent state; and
        entering into said closed position dependent only upon the electrical power received directly from the ringing signal in the active state; and
    said switch remaining in one of said positions based upon the energy from said at least one power supply unit.

2. The electrical device according to claim 1, wherein said switch is an optocoupler.

3. The electrical device according to claim 1, including a switch control line connecting said switch and said control unit.

4. The electrical device according to claim 1, wherein said control unit starts transmitting data from the electrical device after receipt of the data network control signals.

5. The electrical device according to claim 4, wherein said control unit starts transmitting data from the electrical device after receipt of the ringing signal.

6. The electrical device according to claim 1, wherein said control unit starts receiving data sent to the electrical device after receipt of the data network control signals.

7. The electrical device according to claim 6, wherein said control unit starts receiving data from the electrical device after receipt of the ringing signal.

8. In an electrical device for controlling functional units and processing data, for connection to an external data network communicating data network control signals including a ringing signal having an electrical power, and for switching between a quiescent state and an active state, the improvement comprising:
    means for controlling at least one of the functional units, said control means having lines to be connected to the external data network for receiving the data network control signals, and said control means starting data transmission from or to the electrical device after receiving the data network control signals;
    means for supplying energy to at least one of the functional units, said energy supply means having a primary side to be connected to a voltage supply network, said energy supply means connected to said control unit;
    means for switching between an open position and a closed position, said switching means:
        connected to and switching said at least one power supply unit;
        entering into said open position and disconnecting said primary side of said at least one power supply unit from the voltage supply network in the quiescent state; and
        entering into said closed position dependent only upon the electrical power received directly from the ringing signal in the active state; and
    said switching means remaining in one said positions based upon the energy from said at least one power supply unit.

9. A transformer power supply unit, comprising:
    a primary side to be connected to a voltage supply network having a network voltage;
    an electrical switch for selectively switching the network voltage on and off;
    a data line to be connected to an external data network transmitting a ringing signal having electrical power; and
    said switch:
        connected to said primary side and to said data line;
        opening, in a quiescent state, to disconnect said primary side from the voltage supply network; and
        closing, in an active state, to connect said primary side to the voltage supply network based only upon the electrical power of the ringing signal.

* * * * *